Dec. 24, 1935. W. W. ODELL 2,025,071
PROCESS FOR MAKING COMBUSTIBLE GAS
Filed Oct. 2, 1930
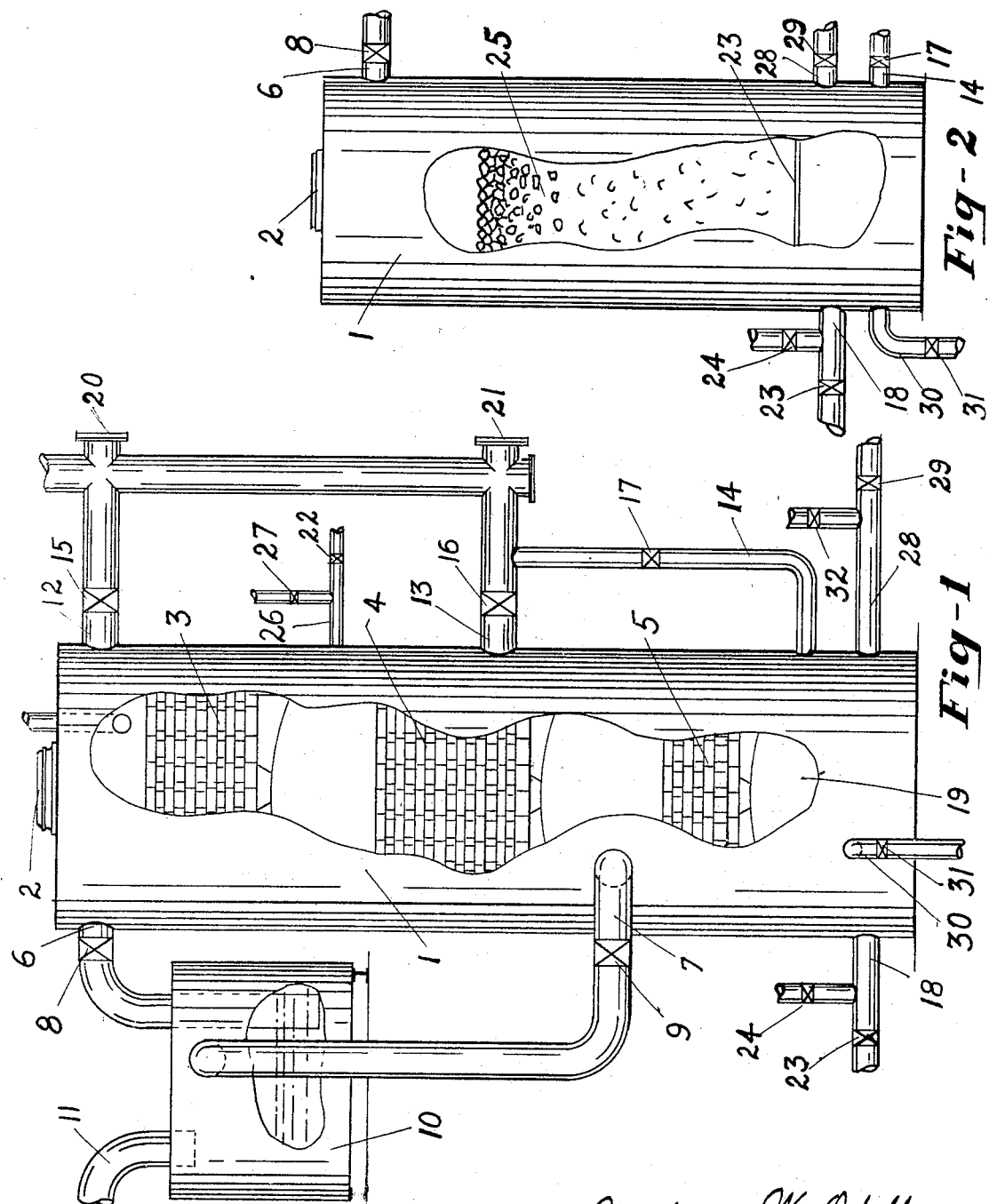
William W. Odell
INVENTOR Patented Dec. 24, 1935

2,025,071

UNITED STATES PATENT OFFICE 2,025,071

PROCESS FOR MAKING COMBUSTIBLE GAS

William W. Odell, Chicago, Ill.

Application October 2, 1930, Serial No. 485,933

5 Claims. (Cl. 48—197)

My process relates to the method of making gas utilizing exhaust gas from gas engines, Diesel engines or their equivalent as a base gas, and subsequently enriching said base.

When operating gas engines with natural gas as the fuel, so much nitric acid or oxides of nitrogen is formed that attempts to use the exhaust gas as a diluent for richer gas have been unsuccessful, so far as I am aware, because of the difficulty in removing said oxides from the resultant gas. In my process I am concerned with the production of a gas substantially free from the oxides of nitrogen.

The objects of my invention include the following:

1. The elimination of oxides of nitrogen from gas containing one or more of such oxides.

2. The use of engine exhaust-gas in stabilizing the calorific value of natural gas and products therefrom including propane, butane and ethane as well as other combustible gases.

3. To produce combustible gas having a very low oxygen content.

The presence of appreciable amounts of oxygen in mixed gas used for city distribution is undesirable for reasons well understood in the gas industry. Likewise I find that the oxides of nitrogen are similarly deleterious and should be removed.

One phase of my process is based on the fact that hydrogen at elevated temperature, particularly in the presence of hot refractory material or other catalyst, reduces the oxides of nitrogen to nitrogen and water as indicated by the following equations:

$$N_2O + H_2 = H_2O + N_2 \quad (1)$$
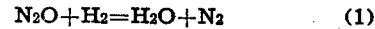
$$2NO + 2H_2 = 2H_2O + N_2 \quad (2)$$
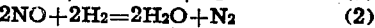
$$2NO_2 + 4H_2 = 4H_2O + N_2 \quad (3)$$
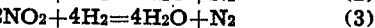
$$N_2O_3 + 3H_2 = 3H_2O + N_2 \quad (4)$$
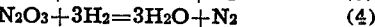
$$N_2O_5 + 5H_2 = 5H_2O + N_2 \quad (5)$$
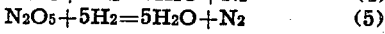

In other words, I cause the exhaust gas, preferably hot, to contact active hydrogen and thereby reduce the nitrogen oxides.

In stabilizing natural gas at say, 1000 B. t. u. per cubic foot, it is necessary to add varying amounts of the engine exhaust-gas accordingly as the calorific value of the natural gas varies above 1000 B. t. u. per cubic foot. It sometimes is desirable to add the minimum amount of the exhaust gas possible and under such conditions it is, or may be, essential to have the minimum amount of excess hydrogen or other extraneous gas present. I have provided means whereby the hot or warm exhaust gas mixes with a relatively small amount of active hydrogen under conditions favorable for the dissociation and reduction of the oxides of nitrogen. On the other hand, there are occasions when it is desirable to use the maximum amount of the leaner gas, namely when the supply of natural gas is low; under such conditions it is commonly desirable to enrich the treated exhaust gas (or enrich it simultaneous with hydrogen treatment) and I have provided means for attaining this result.

Figure 1 is a front elevation, largely diagrammatic, of one form of apparatus in which I practice my invention, and comprises a generator shell checkered and lined within with refractory material, suitably connected with means for transporting gaseous fluids to and from it. A portion of the generator is cut away to show interior in section.

Figure 2 is a front elevation of a modified form of my apparatus and in a sense it may be considered to be a gas producer, having as a surface-contact medium a solid fuel. A portion of the producer is cut away to show interior in section.

Referring to Figure 1, a generator shell is shown at 1, having a top door 2, refractory checkering or the equivalent 3, 4 and 5, gas offtakes at 6 and 7 with control valves 8 and 9. A wash box or gas seal is shown at 10 with outlet 11. Inlets for the supply of engine exhaust gas or other gases of combustion are shown at 12, 13 and 14 with control valves respectively at 15, 16 and 17. Inlet for premix gas and air for combustion is shown at 18. Safety explosion doors are shown at 20 and 21. An inlet to shell 1 for introducing an enricher is shown at 26 with control valve 27. Enricher may also be introduced through 28 and 29 and steam through 30 and control valve 31, and also through 22. A combustion chamber is shown at 19.

Referring to Figure 2, the same system of numbering is used. Instead of a checker system as 3, 4 and 5 of Figure 1, a fuel bed 25 is substituted. A grate is shown at 33. The main up-run supply of exhaust gas is through 14 in this figure.

Referring to Figure 1, one method of operating by my process is as follows: Admit air and gas, preferably premixed, to chamber 1 through 18. Ignite the gas within shell 1 and remove the combustion products through 6 and 8. At this stage (the start) of operation the combustion gas may be discharged to the atmosphere if desired. After the checker work 5 and 4 have become heated to a red heat, engine exhaust gas (gases of combustion) is admitted to 1 through 13 and 16 and, mingling with the combustion gas passes upwardly through the checker work 4 and 3 and is discharged through 6 and 8 to the wash box 10. The engine exhaust gas is preferably supplied to 1 at as high a temperature as is economical; in other words, it is desirable to at least conserve the natural heat content of that gas as much as possible, after it leaves the explosion chambers of an engine. The amount of air-gas mixture or the equivalent supplied beneath 5, as through 18 is sufficient to maintain an elevated temperature in the checker work 4 and 3, preferably at least a red heat under normal circumstances. The air : gas ratio of the heating gas mixture supplied through 18 is so controlled that a reducing atmosphere is maintained above the checker work 5; in other words, in order to reduce the nitrogen oxides the gas comingled therewith should contain hydrogen or aldehydes or both; combustion is controlled in the furnace chamber 19 to provide the reducing atmosphere. The latter is accomplished by one of two methods or both, that is, insufficient air for complete combustion is supplied in the gas-air mixture supplied through 18 or additional combustible gas containing combined hydrogen or free hydrogen is supplied through an auxiliary line such as is shown at 28. The net result of this operation is:

A. The volume of outlet gas is greater than the volume of the engine exhaust-gas supplied through 13.

B. The oxygen content of the outlet gas is very low and may be held to substantially zero.

C. The oxides of nitrogen are reduced.

D. The calorific value of the outlet gas is controlled, varying from about zero upwardly, according to the amount of excess combustible gas admitted through 28 and the amount of enricher introduced through 27 and 26.

During operation, which may be continuous, an adjustment is made between the relative amount of combustion conducted in chamber 19 of Figure 1, and the amount of engine exhaust gas supplied to 1 so that a temperature balance is maintained within chamber 1. A means for cooling refractory 5 is shown in the exhaust gas connection 14. In other words, when a high output is desired it is sometimes desirable to admit at least a portion of the engine exhaust gas through 17 and 14. Obviously, when combustion of the fuel gas is complete in chamber 1 the outlet gas has a low calorific value or zero calorific value, but it has a low oxygen content and is an excellent carrier for propane, butane or other enriching material. I prefer to operate using an excess of combustible gas in chamber 19 so that the engine exhaust-gas contacts sufficient hydrogen, aldehydes or other reducing gas to liberate nitrogen from the oxides of nitrogen in said exhaust gas. When the fuel gas is a hydrocarbon, such as propane, or butane or other gaseous hydrocarbon I prefer to employ such an excess of the fuel gas, admitted through 18, or 28 or through both inlets, that some carbon is liberated. At first the carbon tends to deposit in the brickwork 4 and 3, but finally a state of equilibrium is reached wherein the carbon dioxide and moisture in the exhaust gas and products of combustion react with the carbon according to reactions 6 and 7 when the checker work $$C + CO_2 = 2CO \qquad (6)$$

$$C + H_2O = CO + H_2 \qquad (7)$$

is hot, and according to reaction 8

$$C + 2H_2O = CO_2 + 2H_2 \qquad (8)$$

when the checker work is relatively cooler. The high percentage of $CO_2$ in the combustion gas favors reaction 6. The amount of moisture and carbon dioxide in the combustion gas when complete combustion occurs is indicated for a number of hydrocarbons, as follows:

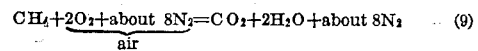

$$CH_4 + 2O_2 + \text{about } 8N_2 = CO_2 + 2H_2O + \text{about } 8N_2 \qquad (9)$$

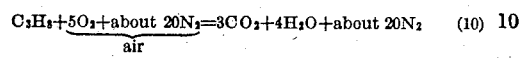

$$C_3H_8 + 5O_2 + \text{about } 20N_2 = 3CO_2 + 4H_2O + \text{about } 20N_2 \qquad (10)$$

With excess of combustible gas some carbon monoxide is formed as well as aldehydes (particularly formaldehyde) and carbon. However, when the fuel gas and air introduced through 18 are in the proper proportion for perfect (complete) combustion without excess of either fluid and when propane, butane, natural gasoline or certain other hydrocarbon is introduced through 28, the gas rising through checker work 5 contains $H_2$, some unsaturated hydrocarbons, carbon and methane in addition to the above mentioned products of combustion. The freshly generated, hot hydrogen is active and readily reacts with oxides of nitrogen. Thus, in my process it is thus possible to partly crack butane, propane, natural gasoline and similar hydrocarbons and produce a large volume of lean gas, substantially free from oxygen or oxides of nitrogen, which can be further enriched by such a gas as methane, ethane, propane, butane, petroleum-refinery gas or similar enricher; in fact, any gas enricher may be used. However, because butane and similar hydrocarbons readily condense at the pressure at which gas is commonly transmitted they are extracted from natural gas and frequently wasted. It is one of the objects of my invention to provide means and a process for creating a market for such condensable fuel.

It will be noted that with the foregoing method of operation, in many natural gas pumping stations, the maximum amount of engine exhaust gas is usually available when the maximum amount of natural gas is being pumped, namely, in the winter months; during this period there is usually a maximum demand for an auxiliary supply of gas and there also is a maximum production of natural gasoline, propane, butane and similar natural-gas products available for use as heating fuel, enricher and for cracking. In the summer months when the demand for natural gas is relatively less it can readily be substituted for the propane, butane, gasoline or the equivalent as fuel, enricher or as the fluid for cracking or for any combination of them. It is believed that a flexible process of this nature is needed in the gas industry and flexibility of operation is one of the objects in the development of my process.

In attempting to use stack gas as a diluent for richer gas, I found that not only was a boiler plant necessary or desirable but also that means must be provided to use the steam generated in order to operate economically. Furthermore, the stack gas commonly contains undesirably large amounts of oxygen, and when this is reduced to nominal amounts, burning natural gas as fuel, there is produced an appreciable and undesirable amount of carbon black besides the oxides of nitrogen; the latter being corrosive must be washed from the gas or otherwise eliminated. Stack gas can be used in my process by substituting it for engine exhaust-gas and the gas produced therefrom is substantially free from oxygen and oxides of nitrogen.

Ordinary molecular hydrogen is not as active in reducing oxides of nitrogen at low temperature as at moderately elevated temperature. It is recognized that gases dissociate at high temperature and in that form are very active chemically, but the amount of reduction of oxides of nitrogen by hydrogen seems to be much greater than that resulting from reaction with atomic (dissociated) hydrogen only. This statement is made after a study of results obtained and after a review of published data on the thermodynamics of hydrogen dissociation. I find that in contact with refractory materials such as alumina, silica, fire brick, iron and certain other heavy metals or their oxides, or both, the oxides of nitrogen are readily reduced by hydrogen. These materials are catalytic to the reactions. The metals are not only catalytic but tend to react chemically in certain cases. For example, nitrous oxide ($N_2O$) supports combustion and hence the metals at about a red heat tend to burn to the oxide; in the presence of hydrogen the metal is not oxidized but rather the nitrous oxide and hydrogen react, the iron functioning as a catalyst. Nitric oxide (NO) performs in a similar manner. When employing very active catalyst such as a prepared metal, certain metal oxides or combinations of them equilibrium is reached so rapidly that, under a given set of conditions, a lower temperature can be employed in the contact mass (catalyst mass) than with less powerful catalysts. With ordinary fire brick, I prefer to maintain the brick surface at a temperature corresponding to a red heat or higher.

Another factor effecting equilibrium is the relative and actual concentrations of the reactants, namely hydrogen and nitrogen oxides in the gaseous mixture. Although concentration of hydrogen and high relative concentration of it favor the reduction of the oxides of nitrogen, satisfactory results are obtained even when the relative amount of hydrogen is not greatly in excess of the theoretical requirements for chemical reaction, by providing sufficient time of contact of the reactants with a catalyst at a favorable temperature.

The reduction of oxides of nitrogen by hydrogen is exothermic and therefore it would seem that high temperature is not favorable to the reactions. No doubt this is true as regards extremely high temperatures but with certain catalysts the reactions actually occur more completely in a minimum duration of time at a temperature above 250° centigrade and preferably at a temperature approximating that of a red heat. With an iron catalyst the explanation of results obtained may be based on the fact that iron, when heated, burns to the oxide in an atmosphere of the oxides of nitrogen, and that the oxides of iron are reduced to the metal by hydrogen at elevated temperature.

As revealed by Figure 1, my process is continuous when the heat required for processing is supplied by the sensible heat of the combustion gas, by the sensible heat of the engine exhaust-gas or by both. Obviously it is possible to supply heat for processing in varying amounts by controlling the amount of combustion in chamber 19 and checker work 5, by controlling the temperature of the combustible gas and air supplied through 18, by controlling the temperature of the exhaust gas supplied through 13, by the regulation of both or by the use of various amounts of steam through 30 and 31. Other means are conceivable for maintaining temperature conditions satisfactory for continuous operation but they are not shown for simplicity.

With continuous operation and with an upward flow only of gaseous fluids there is a tendency for the brick work or other contact material shown at 3 in Figure 1 to reach a high temperature under certain conditions. This heat is utilized when enricher is introduced through 26 and 27; it may be used to facilitate cracking of hydrocarbons, or for vaporizing liquid combustible matter or both. Further provision is made for maintaining a temperature equilibrium in the generator by the downrun connections whereby periodically gases admitted to the generator at the top, as through 12 and 26, are conducted downwardly and out through 7.

It may also be obvious that satisfactory results may be obtained by my process with intermittent operation. For example, the heating operation may be alternated in cycles with the gas making period; this is advantageous when a low content of nitrogen in the finished gas is desired. Under these conditions, during the gas-making period, hydrogen, hydrocarbons or a hydrogen containing gas or a gaseous material capable of yielding hydrogen is introduced into chamber 19, with or without steam as desired and engine exhaust gas is introduced through 13. The downrun may be made as described above. With the belief that my process is broadly new, I do not limit my claims specifically to either intermittent or continuous procedure.

The hydrogen used in my process may be separately generated and supplied to the generator undiluted or diluted, but preferably it is generated within the generator by the thermal decomposition of a fluid capable of thus yielding hydrogen; the decomposition need not be complete. Using natural gas, for example, it is not necessary to decompose the methane but rather chiefly the higher hydrocarbons such as ethane, propane and butane, which decompose more readily than methane. With only partial decomposition of the hydrocarbon introduced as through 18 or 28 of Figure 1, the uncarbureted gas produced has a higher calorific value than when decomposition is complete. The hydrogen concentration increases with increments in the degree of decomposition of the hydrocarbon. The enricher admitted through 26, Figure 1, may also be decomposed completely or only partly dissociated. The degree of cracking of this enricher is controlled by regulating the rate of input of said enricher, the temperature of the surface of the contact material 3, Figure 1, and intimacy and time of contact with said material. High temperature, slow rates of input and long time of contact favor complete decomposition, whereas lower temperatures, high velocity and short time of contact favor incomplete decomposition. Results are also influenced by the choice of enricher used. Natural gas, propane, butane, petroleum still-gas and similar materials may be used as enricher and the temperature in the contact mass may vary according to the effect desired from about 800° F. to that of a bright red heat. Steam may be introduced with the enricher when desired, it retards complete cracking and tends to preserve methane.

It is understood that the contact material used in the generator may be refractory in any desired shape and the catalyst may be the refractory or may be precipitated on the surface of a refractory material. The contact mass for the primary conversion (reduction) of oxides of nitrogen may comprise a fuel bed such as a bed of coke which is effective at elevated temperature. I prefer not to limit myself to a particular catalyst or to the use of a material as contact-material that is commonly referred to as a catalyst because I find that under certain conditions, namely, when the hydrogen is present in large excess, heated refractories not commonly referred to as catalysts, are satisfactory.

Recognizing that it is possible to reduce the oxides of nitrogen present in engine exhaust-gas by the addition of hydrogen, or a compound capable of liberating hydrogen, to the hot exhaust gas at substantially the engine exhaust ports, I claim broadly the step of causing reaction to occur between hydrogen and the oxide or oxides of nitrogen present in a mixed gas; the reaction products being chiefly nitrogen and water; the reactions are preferably caused to occur in a reducing atmosphere. By "reducing atmosphere" is meant an atmosphere substantially free from oxygen.

Summarily, I claim as my own the process of making combustible gas largely from a gaseous fluid containing at least one of the oxides of nitrogen, or an acid derivative therefrom such as nitrous or nitric acid, or both, comprising mixing said fluid with a gas containing or comprising hydrogen, under conditions favorable for the reducton of nitrogen compounds, for sufficient time for the reduction of said oxide or said acid derivative to occur, enriching when, and to the extent desired with suitable carbureting material. The latter step is performed preferably by utilizing the sensible heat of the mixture. Preferably, the operation is continuous; streams of the reactants in predetermined proportions are passed into contact with chosen, solid, contact material confined in a generator and maintained at a temperature satisfactory for the reduction of oxygenated nitrogen compounds. The atmosphere comprising the mixture of the reactant fluids is a reducing atmosphere in as much as it contains an amount of hydrogen in excess of that required to satisfy the chemical equations for the reduction of oxygenated nitrogen compounds. The temperature of the surface contact material which ordinarily is above 250° centigrade, and commonly at about a red heat, may be maintained by the sensible heat of the gas streams. External means of applying heat, such as by electric current, may be used when desired; it is not shown in the figures because electrical heating is not new in principle. Steam may or may not be added to the reactants as desired but it should be noted that when engine exhaust-gas is used as one of the reactant fluids, water vapor is present therein as a product of combustion when the engine fuel contains hydrogen either free or combined.

The apparatus in which I practice my invention is subject to wide variation as to details of construction. It is primarily a reaction chamber or generator having inlets for the reactants, outlets for the products of reaction, contact material within in the path of the reactants therethrough between said inlets and said outlets with means for controlling the temperature of said contact material and means for controlling the relative amounts of reactants supplied thereto. Steam is included as a reactant. The contact mass may be a fuel bed. Other forms of suitable apparatus are conceivable than those shown in Figures 1 and 2. In my apparatus, as shown in Figure 1, I have: means for supplying air, hydrocarbon gas (or hydrogen) and steam into a combustion chamber, means for promoting combustion or partial combustion within the generator shell, means for introducing a gaseous fluid containing an oxygenated compound of nitrogen, means for causing the co-mingling of the various gases within said shell and means for promoting reaction between said nitrogen compound and hydrogen, as well as means for carbureting the resulting mixed gas and means for removing the carbureted gas therefrom. Referring to Figure 1, means for controlling temperature are: regulation of the amount of steam used as through 30, regulation of the amount of heat generated by the control of the amount of air introduced with combustible gas as through 18, regulation of the amount of exhaust gas (or equivalent) admitted through 14, regulation of the amount of combustible gas introduced through 28 and regulation of the introduction of fluids through 26.

Having described my invention so that one skilled in the art can practice it, I claim:

1. The process of making combustible gas substantially free from oxides of nitrogen which gas is a carbureted lean-gas, comprising, heating a mass of confined refractory incombustible solids substantially to incandescence, then reacting hydrocarbons and some steam in contact with said solids forming a rich gas containing free, active hydrogen, immediately commingling the said rich gas and a lean gas containing approximately 0.1% only of a nitrogen oxide, and contacting the gas mixture with another portion of the heated refractory solids thereby simultaneously reducing the said oxide of nitrogen and forming said combustible gas.

2. In the process of making combustible gas substantially free from oxides of nitrogen, which gas is a carbureted lean-gas, in combination, the steps, heating a porous mass of incombustible refractory solids substantially to incandescence, passing a hydrocarbon in the presence of some steam through a portion of the heated solids thereby forming a rich gas containing free, active hydrogen, immediately mixing the said rich gas with a separately generated leaner gas containing approximately 0.1% of an oxide of nitrogen, and passing the mixture into contact with another portion of said heated refractory solids, thereby reducing said oxide of nitrogen and producing said combustible gas.

3. In the process of making combustible gas substantially free from oxides of nitrogen, which gas is a carbureted lean, high-nitrogen-content gas in combination, the steps, heating a porous mass of incombustible refractory solids substantially to incandescence, passing a hydrocarbon in the presence of steam and air through one portion of the heated solids, thereby forming a rich gas containing free, active hydrogen, immediately commingling said rich gas with a separately generated leaner gas containing a small amount only of an oxide of nitrogen, and passing the mixture into contact with another portion of said heated solids, thereby reducing said oxide of nitrogen and producing said combustible gas.

4. The process of making combustible gas substantially free from oxides of nitrogen, which gas is a carbureted gas, comprising, heating a mass of confined checker bricks to incandescence, then reacting gaseous hydrocarbons and some steam in contact with a portion of said solids forming a rich gas containing free, active hydrogen, immediately commingling the said rich gas with a separately generated gas comprising largely inerts, but containing an amount of an oxide of nitrogen of the order of 0.1%, and then contacting the mixture with another portion of the heated mass thereby simultaneously reducing the said oxide of nitrogen and forming said combustible gas.

5. The process of making combustible gas substantially free from oxides of nitrogen, which gas is a carbureted gas, comprising, heating the mass of confined checker bricks to incandescence, then reacting gaseous hydrocarbons and some steam in contact with a portion of said solids forming a rich gas containing free, active hydrogen, immediately commingling the said rich gas with separately generated gaseous products of combustion comprising largely inerts but containing an amount of an oxide of nitrogen of the order of 0.1%, and contacting the mixture with another portion of the heated mass, thereby simultaneously reducing the said oxide of nitrogen and forming said combustible gas.

WILLIAM W. ODELL.